(12) United States Patent
Li et al.

(10) Patent No.: US 11,746,749 B2
(45) Date of Patent: Sep. 5, 2023

(54) DAMPING INTEGRATED DEVICE, DAMPER AND WIND TURBINE

(71) Applicant: BEIJING GOLDWIND SCIENCE & CREATION WINDPOWER EQUIPMENT CO., LTD., Beijing (CN)

(72) Inventors: Shuanghu Li, Beijing (CN); Zhihong Zhang, Beijing (CN); Yang Gao, Beijing (CN); Zhiliang Xu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/999,210

(22) PCT Filed: Sep. 10, 2020

(86) PCT No.: PCT/CN2020/114523
§ 371 (c)(1),
(2) Date: Nov. 17, 2022

(87) PCT Pub. No.: WO2021/237979
PCT Pub. Date: Dec. 2, 2021

(65) Prior Publication Data
US 2023/0193875 A1    Jun. 22, 2023

(30) Foreign Application Priority Data

May 28, 2020    (CN) .......................... 202010469339.1

(51) Int. Cl.
*F03D 7/02*    (2006.01)
*F16F 7/10*    (2006.01)
(Continued)

(52) U.S. Cl.
CPC .......... *F03D 7/0296* (2013.01); *F16F 7/1028* (2013.01); *F16F 7/116* (2013.01); *F16F 15/002* (2013.01); *F05B 2260/964* (2013.01)

(58) Field of Classification Search
None
See application file for complete search history.

(56) References Cited

U.S. PATENT DOCUMENTS

| | | | |
|---|---|---|---|
| 2018/0128345 A1* | 5/2018 | Kai | .......................... F16F 7/116 |
| 2020/0102996 A1 | 4/2020 | Kurabayashi et al. | |

FOREIGN PATENT DOCUMENTS

| | | |
|---|---|---|
| CN | 1318135 A | 10/2001 |
| CN | 102720209 A | 10/2012 |

(Continued)

OTHER PUBLICATIONS

International Search Report and Written Opinion in related PCT Application No. PCT/CN2020/114523, dated Feb. 25, 2021 (8 pages).

(Continued)

*Primary Examiner* — Melanie Torres Williams
(74) *Attorney, Agent, or Firm* — Bayes PLLC (57) ABSTRACT

A damping integrated device, a damper, and a wind turbine are provided. The damping integrated device includes: a base body including an inner cavity extending in the lengthwise direction thereof; a frequency adjustment component disposed in the inner cavity and including an elastic member and a connecting member; a first connector extending into the inner cavity and at least partially protruding out of the base body in the lengthwise direction, the first connector being capable of moving relative to the base body, to make the elastic member stretch or shrink in the lengthwise direction; and a damping component disposed in the inner cavity, being connected to the connecting member and at least partially abutting against an inner wall of the base (Continued)

body, and the damping component being configured to absorb kinetic energy of the first connector.

20 Claims, 7 Drawing Sheets

(51) Int. Cl.
*F16F 7/116* (2006.01)
*F16F 15/00* (2006.01)

(56) References Cited

FOREIGN PATENT DOCUMENTS

| CN | 103994169 | A |   | 8/2014 |   |           |
|----|-----------|---|---|--------|---|-----------|
| CN | 203783823 | U |   | 8/2014 |   |           |
| CN | 204961173 | U |   | 1/2016 |   |           |
| CN | 105351419 | A |   | 2/2016 |   |           |
| CN | 105673353 | A |   | 6/2016 |   |           |
| CN | 106381941 | A | * | 2/2017 | . | E04H 9/021 |
| CN | 106895108 | A |   | 6/2017 |   |           |
| CN | 206770863 | U | * | 12/2017 |   |           |
| CN | 107575526 | A |   | 1/2018 |   |           |
| CN | 108374330 | A |   | 8/2018 |   |           |
| CN | 108561487 | A |   | 9/2018 |   |           |
| CN | 207919795 | U |   | 9/2018 |   |           |
| CN | 110080952 | A |   | 8/2019 |   |           |
| CN | 110475967 | A |   | 11/2019 |   |           |
| CN | 209671522 | U |   | 11/2019 |   |           |
| CN | 111043215 | A | * | 4/2020 | . | F16F 7/116 |
| CN | 210422890 | U |   | 4/2020 |   |           |
| EP | 2746483   | A1 |   | 6/2014 |   |           |
| EP | 3396195   | A1 | * | 10/2018 | . | F16F 7/00 |

OTHER PUBLICATIONS

Notification to Grant Patent Right for Invention in related Chinese Application No. 202010469339.1, dated Jul. 22, 2022 (7 pages).

\* cited by examiner

DAMPING INTEGRATED DEVICE, DAMPER AND WIND TURBINE

CROSS-REFERENCE TO RELATED APPLICATIONS

The present application is a National Stage of International Application No. PCT/CN2020/114523, filed on Sep. 10, 2020, which claims priority to Chinese Patent Application No. 202010469339.1, filed on May 28, 2020. The entire contents of each of the above-identified applications are expressly incorporated herein by reference.

TECHNICAL FIELD

The present disclosure relates to the technical field of damping, and in particular, to a damping integrated device, a damper and a wind turbine.

BACKGROUND

A damper is a device that provides resistance to movement and consumes movement energy. The use of damping to absorb energy and reduce vibration has been used in aerospace, aviation, military, wind power and other industries for a long time.

In the technical field of wind power, the tower is a supporting structure of the wind turbine, and the structural safety and stability thereof are related to the safety performance of the wind turbine. With continuous increase of capacity of the wind turbine, the continuous increase of the height of the tower and the continuous decrease of the frequency of the tower makes the vibration problem of the tower more and more prominent. In order to ensure the safe and stable operation of the tower and the whole wind turbine, it is necessary to install the damper on the tower to suppress the vibration of the tower and ensure the safe operation of the wind turbine.

Nowadays, many devices have been developed for the vibration damping of the tower, and the technology of tuned mass damper is mature and reliable and is widely used in high buildings, bridges and other fields. In the towering structures such as the tower of the wind turbine, the mass block is mainly employed in the tuned mass damper as the main vibration damping body, during vibrating of the tower, the purpose of vibration reduction of the wind turbine can be achieved by the vibration inertial force of the mass block and its damping energy dissipation device. Although this kind of damper can achieve the effect of vibration reduction, it also has corresponding drawbacks, which are mainly manifested in that the frequency adjustment component and damping component are designed separately and independently of each other and are disposed in different positions of the damper. Thus, different interfaces are required between the above components and the environment (e.g., the tower) in which the damper is applied, so the structural design is complicated. Meanwhile, the frequency adjustment component, the damping component and other components are scattered in different positions, which is bad for maintenance.

Therefore, there is an urgent need for a novel damping integrated device, damper and wind turbine.

The embodiments of the present disclosure provide a damping integrated device, a damper, and a wind turbine. The damping integrated device can satisfy the requirements of both frequency adjustment and damping, and has a simple structure design and is easy to maintain.

In one aspect, according to an embodiment of the present disclosure, a damping integrated device is provided, including: a base body having a predetermined length and including an inner cavity extending along a lengthwise direction thereof; a frequency adjustment component disposed in the inner cavity, the frequency adjustment component including an elastic member and a connecting member, with one end of the elastic piece in the lengthwise direction being connected to the base body and the other end thereof being connected to the connecting member; a first connector extending into the inner cavity and at least partially protruding out of the base body in the lengthwise direction, the first connector being connected to the connecting member and being capable of moving relative to the base body so as to make the elastic member stretch or shrink in the lengthwise direction; and a damping component disposed in the inner cavity, the damping component being connected to the connecting member and at least partially abutting against an inner wall of the base body, and the damping portion being configured to absorb kinetic energy of the first connector.

According to an embodiment of one aspect of the present disclosure, the elastic member includes two or more springs spaced apart and extending in the lengthwise direction respectively, one end of each of the two or more springs is connected to the base body and the other end thereof is connected to the connecting member, and at least one of the two or more springs is detachably connected to the base body and the connecting member, respectively.

According to any one of the aforementioned embodiments of one aspect of the present disclosure, the base body includes a cylinder extending along the lengthwise direction and end caps respectively provided at both ends of the cylinder in the lengthwise direction, the end caps and the cylinder are enclosed together to form the inner cavity, and in a direction intersecting the lengthwise direction, a spacer cavity is formed between the cylinder and the frequency adjustment component, and the damping component is located in the spacer cavity.

According to any of the foregoing embodiments of one aspect of the present disclosure, the damping component includes a mounting member, a supporting member, and a magnet, one end of the mounting member in the lengthwise direction is connected to the connecting member, the magnet is disposed facing the cylinder and is connected to the mounting member, the supporting member is supported between the mounting member and the cylinder, such that an air gap is formed between the magnet and the cylinder; and the first connector is capable of driving the magnet to move relative to the base body via the connecting member and generating an induced eddy current in the base body.

According to any one of the aforementioned embodiments of one aspect of the present disclosure, the mounting member has a cylindrical structure and is disposed around the elastic member, the connecting member is shaped to match the mounting member and is connected to and closes one end of the mounting member in the lengthwise direction, and the magnet includes a plurality of magnet blocks; and at least part of the plurality of magnet blocks are spaced apart in the lengthwise direction, and/or, at least part of the plurality of magnet blocks are spaced apart along an outer annular surface of the mounting member.

According to any of the aforementioned embodiments of one aspect of the present disclosure, the supporting member includes two or more sliders, which are spaced apart and are fixedly connected to the mounting member, respectively; or, the supporting member includes two or more first rollers, which are spaced apart and are rotatably connected to the mounting member, respectively.

According to any one of the aforementioned embodiments of one aspect of the present disclosure, the cylinder is provided with a first opening which is in communication with the inner cavity, and the mounting member is provided with a second opening which is disposed opposite to the first opening.

According to any one of the aforementioned embodiments of one aspect of the present disclosure, the damping component includes a friction body connected to the connecting member, the friction body abuts against the cylinder, the first connector is capable of driving the friction body to move relative to the cylinder through the connecting member, such that the friction body is in friction fit with the cylinder; or, the damping component includes a bearing body with a closed cavity and a damping liquid disposed in the closed cavity, the bearing body is in a shape of an annular cylinder and is disposed around the elastic member, and the bearing body is connected to the connecting member and abuts against the cylinder, and the first connector is capable of driving the bearing body to move relative to the base body through the connecting member, such that the damping fluid reciprocates along the lengthwise direction.

According to any one of the foregoing embodiments of one aspect of the present disclosure, the damping integrated device further includes a non-return limiting component, the non-return limiting component is connected to one end of the base body in the lengthwise direction, and the non-return limiting component is configured to limit a maximum dimension of the first connector protruding out of the base body in the lengthwise direction.

According to any one of the aforementioned embodiments of one aspect of the present disclosure, the non-return limiting component includes an adjusting rod extending along the lengthwise direction and connected to the base body, the adjusting rod at least partially extends into the inner cavity, and a size of the adjusting rod extending into the inner cavity is adjustable, and the adjusting rod abuts against a surface of the connecting member away from the elastic part to limit a displacement amount of the connecting member along the lengthwise direction in the base body; or, the non-return limiting component includes a friction plate located in the inner cavity and connected on a side of the base body away from the elastic member in the lengthwise direction, and the friction plate be in friction fit with the connecting member to stop the connecting member.

According to any one of the aforementioned embodiments of an aspect of the present disclosure, the adjusting rod is an elastic rod, and the adjusting rod is capable of being deformed by force in the lengthwise direction.

According to any of the foregoing embodiments of one aspect of the present disclosure, a buffer pad capable of being deformed by force in the lengthwise direction is provided on a surface of the connecting member away from the elastic member, and the buffer pad is disposed facing the non-return limiting component.

According to any one of the aforementioned embodiments of one aspect of the present disclosure, the first connector is a rod member, the base body is provided with a through hole at a position where the base body is connected to the first connector, a second roller is provided on a side wall enclosing the through hole, and the base body is in rolling fit with the first connector through the second roller; and/or, the damping integrated device further includes a second connector, which is disposed opposite to the first connector in the lengthwise direction, and the second connector is connected to an end of the base body away from the first connector.

In another aspect, according to an embodiment of the present disclosure, a damper is provided, including: a damping body portion; and the damping integrated device as described above, wherein a portion of the first connector of the damping integrated device protruding out of the base body is rotatably connected to the damping body portion.

According to an embodiment of another aspect of the present disclosure, the damping body portion includes a swing arm and a first mass block connected to the swing arm, and the portion of the first connector protruding out of the base body is hinged with the first mass block; or, the damping body portion includes a base, an arc-shaped slide rail supported on the base, and a second mass block disposed on the arc-shaped slide rail and slidably connected to the arc-shaped slide rail, the portion of the first connector protruding out of the base body is hinged with the second mass block, and an end of the base body away from the first connector is hinged with the base.

In yet another aspect, according to an embodiment of the present disclosure, a wind turbine is provided, including the damper as described above.

The damping integrated device provided according to the embodiments of the present disclosure includes the base body, the frequency adjustment component, the first connector, and the damping component. The frequency adjustment component includes an elastic member and a connecting member disposed in the inner cavity of the base body, the elastic member is respectively connected with the base body and the connecting member, and the connecting member is connected to the first connector. The damping component is also located in the inner cavity of the base body, and is connected to the connecting member and abuts against the inner wall of the base body. When the damping integrated device is in use, the main body portion of the damper may be connected with the component to be damped via the first connector and the end of the base body away from the first connector, respectively. Since both the elastic member and the damping component are connected to the first connector via the connecting member, and are connected to or press against the base body, respectively, the frequency of the damper can be adjusted by the frequency adjustment component to match the frequency of the component to be damped, and the kinetic energy of the first connector can be absorbed by the damping component, thereby achieving the effect of damping. Therefore, the damping integrated device has both frequency adjustment and damping characteristics. Since the frequency adjustment component and the damping component are integrated into the inner cavity of the base body, the damping integrated device has a compact overall structure and is easy to maintain while satisfying the requirements for frequency adjustment and damping. In addition, since both the damping component and the frequency adjustment component are connected with the external components through the first connector and the base body, the damping integrated device has few interfaces and strong versatility.

BRIEF DESCRIPTION OF DRAWINGS

The features, advantages and technical effects of the exemplary embodiments of the present disclosure will be described below with reference to the accompanying drawings.

DESCRIPTION OF REFERENCE SIGNS

1—damper;
100—damping integrated device;
10—base body; 10a—inner cavity; 10b—through hole; 11—cylinder; 111—first opening; 12—end cap;
20—frequency adjustment component; 21—elastic member; 211—spring; 22—connecting member; 20a—first hanging ring; 20b—second hanging ring; 20c—transition plate;
30—first connector;
40—damping component; 41—mounting member; 411—second opening; 42—supporting member; 421—slider; 422—first roller; 43—magnet; 431—magnet block; 44—bearing body; 441—closed cavity; 45—damping fluid; 40a—friction body;
50—non-return limiting component; 51—adjusting rod; 52—locking nut; 50a—friction plate;
60—buffer pad;
70—second roller; 80—second connector; 90—air gap;
200—damping body portion; 200a—swing arm; 200b—first mass block; 200c—base; 200d—arc-shaped slide rail; 200e—second mass block;
2—tower; 3—nacelle; 4—generator; 5—impeller; 5a—hub; 5b—blade;
X—lengthwise direction.

In the drawings, the same components are indicated by the same reference numerals. The drawings are not drawn to actual scale

DETAILED DESCRIPTION

Features and exemplary embodiments of various aspects of the present disclosure are described in detail below. Numerous specific details are disclosed in the following detailed description to provide a thorough understanding of the present disclosure. However, it will be apparent to those skilled in the art that the present disclosure may be practiced without some of these specific details. The following description of embodiments is merely to provide a better understanding of the present disclosure by illustrating examples of the present disclosure. In the drawings and the following description, at least some well-known structures and techniques have not been shown in order to avoid unnecessarily obscuring the present disclosure. For purpose of clarity, the dimensions of some of the structures may be exaggerated. Furthermore, the features, structures or characteristics described below may be combined in any suitable manner in one or more embodiments.

The orientation words appearing in the following description refer to the directions shown in the figures, and are not intended to limit the specific structures of the damping integrated device, the damper and the wind turbine of the present disclosure. In the description of the present disclosure, it should also be noted that, unless otherwise expressly specified and limited, the terms "installed" and "connected" should be appreciated in a broad sense, for example, a connection may be a fixed connection, a detachable connection, or an integral connection; or may be a direct connection or an indirect connection. For those skilled in the art, the specific meanings of the above terms in the present disclosure shall be appreciated according to specific circumstances.

In order to better understand the present disclosure, a damping integrated device, a damper, and a wind turbine according to the embodiments of the present disclosure will be described in detail below with reference to FIGS. 1 to 15.

Figure 1:
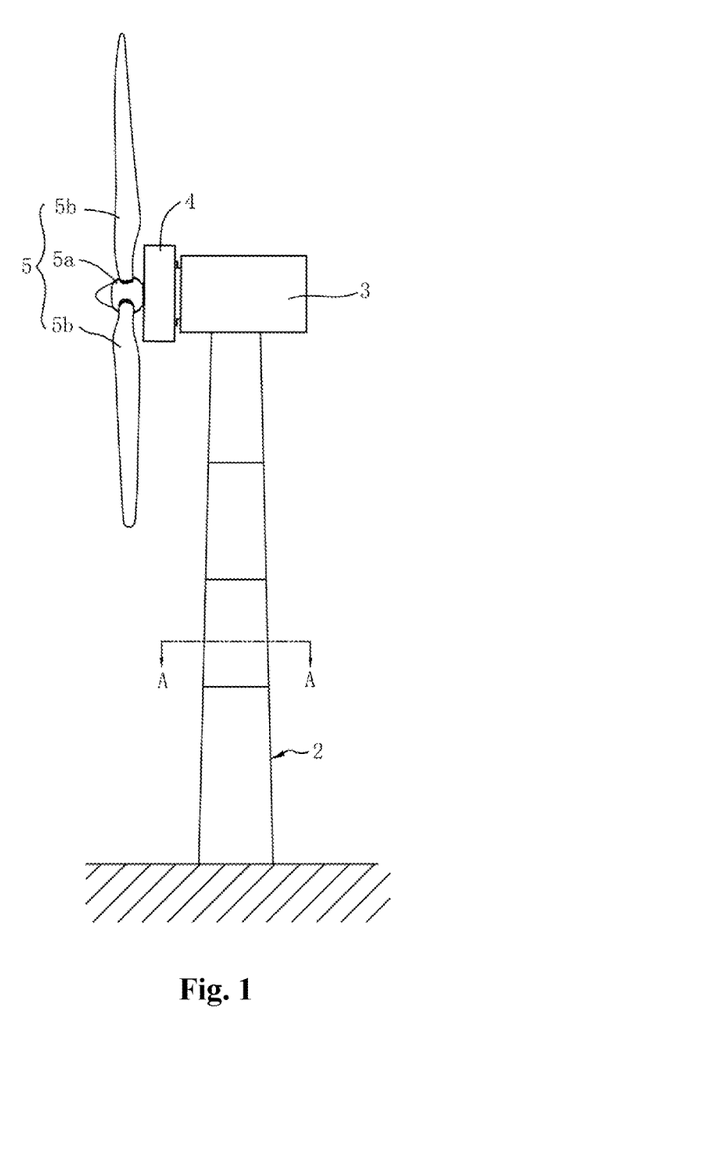
FIG. 1 is a schematic structural diagram of a wind turbine according to an embodiment of the present disclosure.
Figure 2:
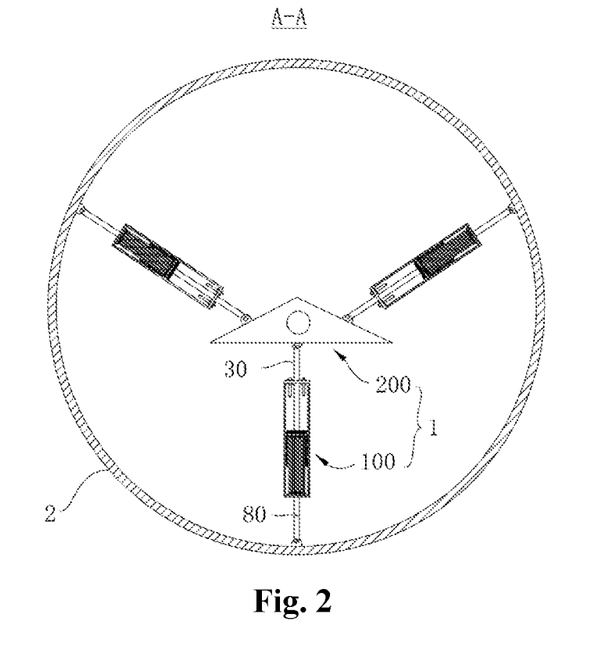
FIG. 2 is a sectional view taken along A-A direction in FIG. 1.
Figure 3:
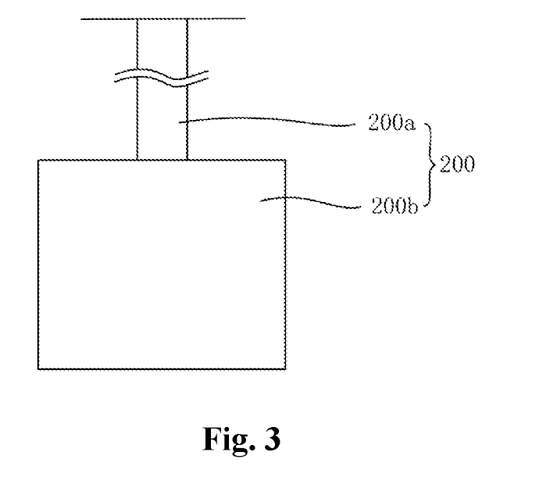
FIG. 3 is a schematic structural diagram of a damping body portion of a damper according to an embodiment of the present disclosure.

Referring to FIGS. 1 to 3, an embodiment of the present disclosure provides a wind turbine including a tower 2, a nacelle 3, a generator 4 and an impeller 5. The nacelle 3 is disposed on the top of the tower 2. The generator 4 is disposed on the nacelle 3, may be located inside the nacelle 3, or may be located outside the nacelle 3. The impeller 5 includes a hub 5a and a plurality of blades 5b connected to the hub 5a, and the impeller 5 is connected to a rotor of the generator 4 through the hub 5a. When the wind acts on the blades 5b, the entire impeller 5 and the rotor of the generator 4 are driven to rotate, so as to convert wind energy into electrical energy.

In order to ensure the safe operation of the wind turbine, the wind turbine provided in the embodiment of the present disclosure further includes a damper 1. By means of the damper 1, it is possible to suppress the vibration of components such as the tower 2 of the wind turbine to ensure the safe operation of the wind turbine. In some optional embodiments, the damper 1 may be disposed inside the tower 2.

Please continue to refer to FIG. 2 and FIG. 3, an embodiment of the present disclosure further provides a damper 1. The damper 1 includes a damping body portion 200 and a damping integrated device 100, and the damping integrated device 100 is connected to the damping body portion 200.

In some optional embodiments, the damping body 200 may include a swing arm 200a and a first mass block 200b connected to the swing arm 200a. Optionally, one end of the swing arm 200a may be connected to the first mass block 200b, and the other end thereof may be connected to the tower 2. In some optional examples, the other end of the swing arm 200a may be connected to a structure (e.g., a tower platform) inside the tower 2. Through the swing arm 200a, it is possible to obtain the kinetic energy generated by the vibration of the component to be damped (e.g., the tower 2), thereby driving the first mass block 200b to swing.

Since the damper 1 is required to provide the requirements for frequency adjustment and damping to the component to be damped (e.g., the tower 2), the traditional damper, the components that realize the frequency adjustment function, and the components that realize the damping function are independently provided and arranged at different positions of the damper. Since the tower 2 has a narrow inner space, there is a possibility that the structure of the traditional damper will introduce more interference. For example, the risk of interference between various components of the damper and between these components of the damper and the related accessories inside the tower (e.g., ladders), makes the structural design of the damper more complicated. Meanwhile, components such as frequency adjustment components and damping components are scattered in different positions, so respective interfaces are needed between these components and the environment (e.g., the tower 2) in which the damper is applied, thereby causing many interfaces and inconvenient maintenance.

In view of above, an embodiment of the present disclosure further provides a damping integrated device 100, which enable the damper 1 to have a simple structure design and be easy to maintain while enabling the damper 1 to satisfy the requirements for frequency adjustment and damping meanwhile. Meanwhile, the damping integrated device 100 may be produced and sold separately as an independent component. Apparently, in some examples, the damping integrated device 100 may also be used in the damper 1 of the above-mentioned embodiment and used be a component of the damper 1.

Figure 4:
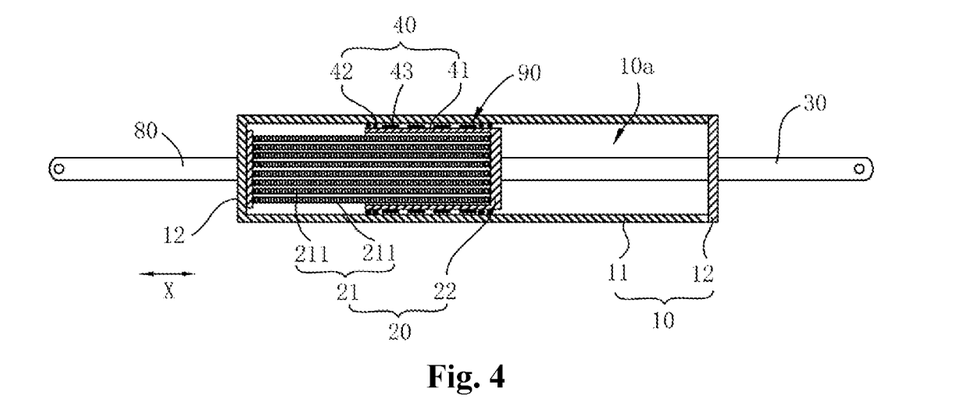
FIG. 4 is a schematic cross-sectional structural diagram of a damping integrated device according to an embodiment of the present disclosure.
Figure 5:
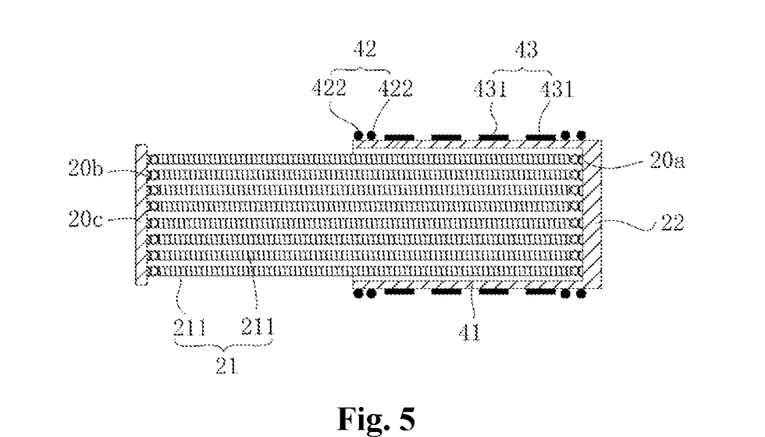
FIG. 5 is a partial cross-sectional structural schematic diagram of a damping integrated device according to an embodiment of the present disclosure.
Figure 6:
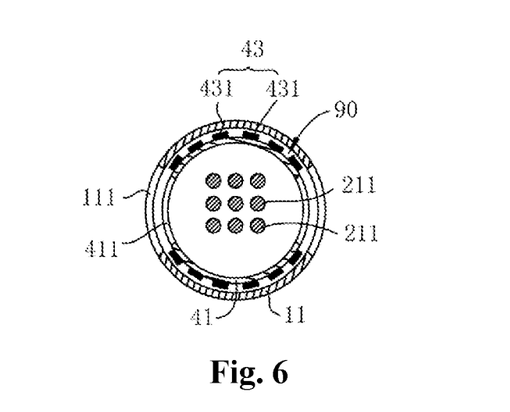
FIG. 6 is a cross-sectional diagram of a damping integrated device taken along a lengthwise direction according to an embodiment of the present disclosure.
Figure 7:
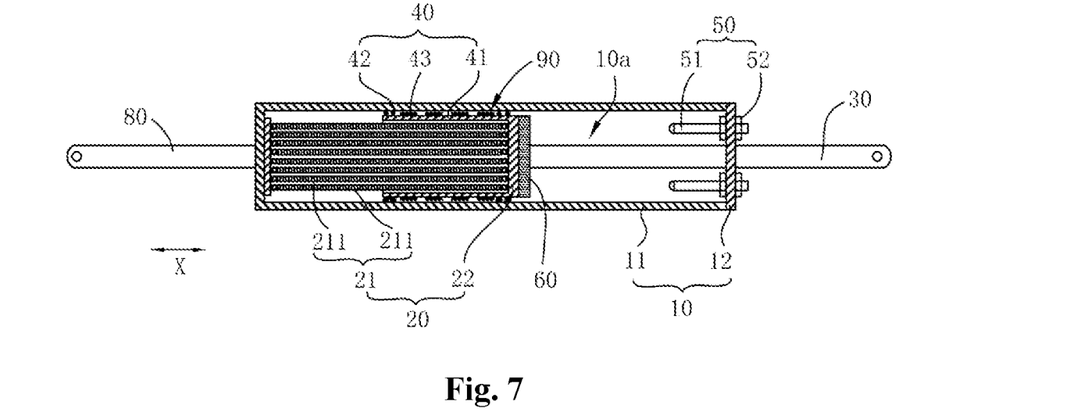
FIG. 7 is a schematic cross-sectional structural diagram of a damping integrated device according to another embodiment of the present disclosure.
Figure 8:
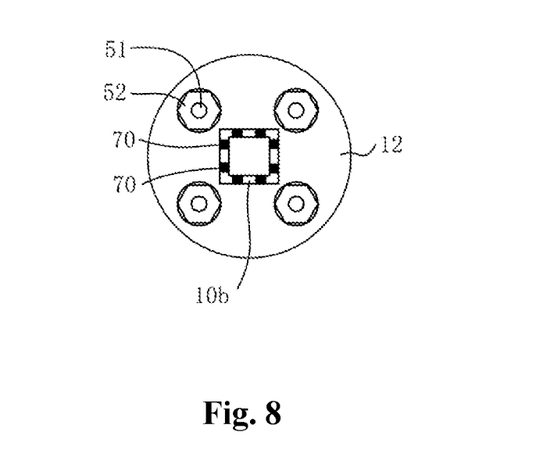
FIG. 8 is a side diagram of a damping integrated device according to another embodiment of the present disclosure.

Please refer to FIG. 4 to FIG. 6 together. The damping integrated device 100 provided in the embodiment of the present disclosure includes a base body 10, a frequency adjustment component 20, a first connector 30 and a damping component 40. The base body 10 has a predetermined length and includes an inner cavity 10a extending along a lengthwise direction X thereof. The frequency adjustment component 20 is disposed in the inner cavity 10a. The frequency adjustment component 20 includes an elastic member 21 and a connecting member 22. One end of the elastic member 21 in the lengthwise direction X is connected to the base body 10 and the other end thereof is connected to the connecting member 22. The first connector 30 extends into the inner cavity 10a and at least partially protrudes out of the base body 10 in the lengthwise direction X. The first connector 30 is connected to the connecting member 22 and is capable of moving relative to the base body 10, so as to make the elastic member 21 stretch or shrink in the lengthwise direction X. The damping component 40 is disposed in the inner cavity 10a. The damping component 40 is connected to the connecting member 22 and at least partially abuts against an inner wall of the base body 10. The damping component 40 is configured to absorb the kinetic energy of the first connector 30.

The damping integrated device 100 provided in the embodiment of the present disclosure includes the frequency adjustment component 20 and the damping component 40, and integrates the frequency adjustment component 20 and the damping component 40 into the inner cavity 10a of the base body 10. When the damping integrated device 100 is in use, a portion of the first connector 30 protruding out of the base body 10 may be rotatably connected with the damping body portion 200, and an end of the base body 10 away from the first connector 30 may be connected to the component to be damped (e.g., the tower 2) or other components of the damping body portion 200. Since the elastic member 21 and the damping component 40 are both connected to the first connector 30 via the connecting member 22, and are both connected to or abut against the base body 10, when the component to be damped vibrates, the frequency of the damper 1 can be adjusted by the frequency adjustment component 20, and the kinetic energy of the vibration transmitted to the first connector 30 can be absorbed by the damping component 40, thereby the damping effect can be achieved. That is, the damping integrated device 100 has both frequency adjustment and damping characteristics. The frequency adjustment component 20 and the damping component 40 are integrated into the inner cavity 10a of the base body 10, so the damping integrated device 100 has a compact overall structure and is easy to maintain while satisfying the requirements for frequency adjustment and damping. Meanwhile, the damping component 40 and the frequency adjustment component 20 are both connected with the external components via the first connector 30 and the base body 10, so few interfaces and strong versatility can be achieved.

As an optional implementation, the elastic member 21 provided in the above embodiments includes two or more springs 211 spaced apart and respectively extending along the lengthwise direction X. One end of each spring 211 is connected to the base body 10 and the other end thereof is connected to the connecting member 22. By providing the elastic member 21 to include two or more springs 211 which are spaced apart, the overall structure of the elastic member 21 is simplified, and the frequency adjustment characteristics of the damping integrated device 100 are better optimized. Therefore, when the damping integrated device 100 is applied to the damper 1, the requirement for frequency adjustment of damper 1 can be better ensured.

As an optional implementation, at least one spring 211 may be detachably connected to the base body 10 and the connecting member 22, respectively. With the above configuration, the number of springs 211 included in the elastic member 21 may be changed as required, thereby better ensuring the requirement for frequency adjustment of the damping integrated device 100, so that the damper 1 to which the damping integrated device 100 is applied can adjust the number of springs 211 according to the frequency of the component to be damped (e.g., the tower 2), so as to keep the frequencies of the both be consistent as much as possible and better optimize the damping effect.

As an optional implementation, a plurality of first hanging rings 20a may be provided on a surface of the connecting member 22 facing the elastic member 21 in the lengthwise direction X, and a plurality of second hanging rings 20b being in one-to-one correspondence with the first hanging rings 20a may be provided on a surface of the inner cavity 10a of the base body 10 facing the connecting member 22. One end of the spring 211 facing the first hanging ring 20a is hooked onto and is detachably connected with the first hanging ring 20a, and the other end of the spring 211 facing the second hanging ring 20a is hooked onto and is detachably connected with the second hanging ring 20b. With the above configuration, the detachable connection of the spring 211 can be ensured.

In some optional embodiments, each of the springs 211 may be detachably connected to the base body 10 and the connecting member 22, respectively. With the above configuration, the frequency of the damper 1 into which the damping integrated device 100 is applied can be adjusted to be closer to the frequency of the component to be damped, and the damping effect can be ensured. Meanwhile, with the above configuration, it is possible to facilitate the replacement of the spring 211, thereby ensuring that the elastic coefficient of the spring 211 always satisfies the requirement for frequency adjustment of the damping integrated device 100.

As an optional implementation, the damping integrated device 100 provided in the above embodiments may further include a transition plate 20c, and the base body 10 may be connected to each spring 211 of the elastic member 21 via the transition plate 20c. When the transition plate 20c is included, the second hanging rings 20b may be indirectly connected to the base body 10 through the transition plate 20c. By providing the transition plate 20c, the installation of the elastic member 21 can be further facilitated, while the damping integrated device 100 can be easily processed and assembled as a whole, and the wear on the base body 10 can be reduced.

Optionally, the transition plate 20c and the connecting member 22 may be both in a plate-like structure and disposed opposite to each other in the lengthwise direction X, and each of the springs 211 may be connected between the transition plate 20c and the connecting member 22.

Please continue to refer to FIG. 4 to FIG. 6, as an optional implementation, in the damping integrated device 100 provided in the above-mentioned embodiments of the present disclosure, the base body 10 includes a cylinder 11 extending along the lengthwise direction X and end caps 12 respectively disposed at both ends of the cylinder 11 in the lengthwise direction X, and the end caps 12 and the cylinder 11 are enclosed together to form an inner cavity 10a. In a direction intersecting with the lengthwise direction X, in particular a direction perpendicular to the lengthwise direction X, a spacer cavity is formed between the cylinder 11 and the frequency adjustment component 20, and the damping component 40 is located in the spacer cavity. With the above configuration, the requirements for frequency adjustment and damping of the damping integrated device 100 can be better satisfied, while the internal space of the base body 10 can be better utilized to satisfy the integration requirements.

In some optional embodiments, in the lengthwise direction X of the base body 10, the cylinder 11 may have an annular cross section, and the end cap 12 is shaped to match the cylinder 11. The two end caps 12 in the lengthwise direction X may be detachably connected to the cylinder 11, respectively. Alternatively, in some examples, one of the end cap 12 may be fixedly connected to or integrally formed with the cylinder 11, and the other of the end caps 12 may be detachably connected to the cylinder 11. With the configuration, the installation of the frequency adjustment component 20 and the damping component 40 can be facilitated. Optionally, one of the end cap 12 may be engaged with the first connector 30. Optionally, the end cap 12 that engages with the first connector 30 may be detachably connected with the cylinder 11.

In some optional embodiments, in the damping integrated device 100 provided in the above embodiments, the damping component 40 includes a mounting member 41, a supporting member 42 and a magnet 43. One end of the mounting member 41 in the lengthwise direction X is connected to the connecting member 22, the magnet 43 is disposed facing the cylinder 11 and is connected to the mounting member 41, and the supporting member 42 is supported between the mounting member 41 and the cylinder 11 such that an air gap 90 is formed between the magnet 43 and the cylinder 11. The first connector 30 is capable of driving the magnet 43 to move relative to the base body 10 along the lengthwise direction X through the connecting member 22 and generating an induced eddy current in the base body 10.

By adopting the above-mentioned structural form, when the component to be damped (e.g., the tower 2) to which the damping component 40 is applied vibrates, since the first connector 30 is connected to the first mass block 200b of the damping body portion 200, the vibration of the component to be damped makes the first mass block 200b drive the first connector 30 to move along the lengthwise direction X, in turn making the magnet 43 move relative to the cylinder 11 and generating the induced eddy current inside the cylinder 11, so as to absorb the kinetic energy of the first connector 30 and convert it into thermal energy, thereby reducing the vibration of the component to be damped. In addition, during this process, each spring 211 of the frequency adjustment component is stretched or shrunk due to the movement of the first connector 30, so as to adjust the frequency of the damper 1.

In some optional embodiments, in the damping integrated device 100 provided in the above embodiments, the mounting member 41 has a cylindrical structure and is disposed around the elastic member 21. The connecting member 22 is shaped to match the mounting member 41, and is connected to and closes one end of the mounting member 41 in the lengthwise direction X. The magnet 43 includes a plurality of magnet blocks 431, and at least part of the magnet blocks 431 are spaced apart in the lengthwise direction X. With the above configuration, the damping integrated device 100 can be made more compact in structure while the requirements for frequency adjustment and damping are satisfied, the frequency of the damper 1 can be better adjusted, and the kinetic energy of the first mass block 200b acting on the first connecting member 30 can be consumed to ensure the vibration reduction effect.

As an optional implementation, at least part of magnetic blocks 431 may be spaced apart along an outer annular surface of the mounting member 41 according to the vibration reduction requirement.

In some optional embodiments, the mounting member 41 may be integrally formed with the connecting member 22, thereby achieving high connection strength and easy installation.

In some optional embodiments, in the damping integrated device 100 provided in the above embodiments, the mounting member 41 may be disposed coaxially with the cylinder 11 of the base body 10. Therefore, when the mounting member 41 moves relative to the cylinder 11 together with the first connector 30, the eddy current generated on the cylinder 11 is more uniform, and the kinetic energy of the first connector 30 can be better converted into the thermal energy on the cylinder 11, thereby ensuring the damping effect.

As an optional implementation, in the damping integrated device 100 provided in the above embodiments, the supporting member 42 includes two or more first rollers 422, which are spaced apart and are rotatably connected to the mounting member 41 respectively. Since the supporting member 42 adopts the above-mentioned structural form, it is possible to not only ensure the formation of the air gap 90 between the magnet 43 and the cylinder 11, but also form a rolling friction between the supporting member 42 and the inner wall of the base body 10, thereby ensuring the smooth movement of the first connector 30 to drive the mounting member 41, better absorbing the kinetic energy of the first connector 30, and ensuring the damping effect of the damping integrated device 100 and the damper 1 to which the damping integrated device 100 is applied.

Optionally, the magnets 43 are provided with first rollers 422 at both ends in the lengthwise direction X, respectively. Optionally, the two or more first rollers 422 are spaced apart in a circumferential direction of the mounting member 41, thereby the uniformity of the air gap 90 formed between the magnet 43 and the cylinder 11 can be ensured.

In some optional embodiments, a depression (not shown) may be provided on an outer circumferential surface of the cylinder 11, so that at least portion of the first roller 422 extends into the depression and is rotatably connected to the cylinder 11 through a rotating member such as a rotating shaft.

Please continue to refer to FIG. 4 to FIG. 6, as an optional implementation, in the damping integrated device 100 provided in the above embodiments, the cylinder 11 is provided with a first opening 111, and the first opening 111 is in communication with the inner cavity 10a. The damping component 40 can generate the eddy current on the cylinder 11 to convert the kinetic energy of the first connector 30 into thermal energy of the cylinder 11. By providing the first opening 111 on the cylinder 11, the sufficient heat dissipation of the damping integrated device 100 can be facilitated and the damping effect of the damping integrated device 100 can be ensured. Meanwhile, with the above configuration, the maintenance of the internal structure of the damping integrated device 100 can be also facilitated, for example, the disassembly and assembly and replacement of the spring 211 and the like of the elastic member 21 can be facilitated.

Optionally, the number of the first opening 111 is not limited, it may be one, alternatively, may also be two or more. When there are two or more first openings 111, the two or more first openings 111 are distributed at intervals in the circumferential direction of the cylinder 11. Optionally, the first opening 111 penetrates a side wall of the cylinder 11 in a radial direction of the cylinder 11 and is in communication with the inner cavity 10a.

In some optional embodiments, in the damping integrated device 100 provided in the above embodiments, the mounting member 41 is provided with a second opening 411, and the second opening 411 is disposed opposite to the first opening 111, and thereby the requirements for heat dissipation and maintenance of the damping integrated device 100 can be better ensured.

Optionally, the second opening 411 and the first opening 111 may be disposed opposite to each other in the direction intersecting the lengthwise direction X. In some optional examples, the second opening 411 and the first opening 111 are disposed opposite to each other in the radial direction of the cylinder 11.

Please refer to FIG. 2 to FIG. 8 together. As an optional implementation, the damping integrated device 100 provided in the above embodiments of the present disclosure further includes a non-return limiting component 50. The non-return limiting component 50 is connected to one end of the base body 10 in the lengthwise direction X, and the non-return limiting component 50 is configured to limit a maximum dimension of the first connector 30 protruding out of the base body 10 in the lengthwise direction X. With the above configuration, the damping integrated device 100 can also have a non-return limiting function. Since the first connector 30 may be connected with the first mass block 200b of the damping body portion 200, the movement range of the first mass block 200b can be further limited by limiting limit the maximum dimension of the first connector 30 protruding out of the base body 10 in the lengthwise direction X. Therefore, the requirement of vibration damping of the damper 1 to which the damping integrated device 100 is applied are satisfied, while the component to be damped (e.g., the tower 2) can be prevented from being damaged due to the collision between the component to be damped and the damping body portion 200, thereby the safety of vibration damping can be ensured.

In some optional embodiments, in the damping integrated device 100 provided in the above embodiments, the non-return limiting component 50 includes an adjusting rod 51 extending along the lengthwise direction X and connected to the base body 10. The adjusting rod 51 at least partially extends into the inner cavity 10a, and a size of the adjusting rod 51 extending into the inner cavity 10a is adjustable. The adjusting rod 51 may abut against a surface of the connecting member 22 away from the elastic element 21 to limit the displacement amount of the connecting member 22 along the lengthwise direction X in the base body 10.

By adopting the above-mentioned structure, the non-return limiting component 50 can limit the displacement amount of the connecting member 22 along the lengthwise direction X in the base body 10 by changing the size of the adjusting rod 51 extending into the inner cavity 10a. Since the first connector 30 is connected to the connecting member 22, the maximum size of the first connector 30 protruding out of the base body 10 in the lengthwise direction X can be limited by limiting the displacement amount of the connecting member 22 along the lengthwise direction X, thereby the safety of the damper 1 can be ensured.

As an optional implementation, the end cap 12, through which the first connector 30 penetrates, may be provided with a connecting hole penetrating along the lengthwise direction X, and may be provided with a locking nut 52 threadedly connected to the adjusting rod 51. The adjusting rod 51 may be inserted into the inner cavity 10a through the connecting hole and locked in the relative position of the end cap 12 by the locking nuts 52 disposed oppositely in the lengthwise direction X and disposed on both sides of the same end cap 12. When the size of the adjusting rod 51 extending into the inner cavity 10a needs to be changed, the adjustment can be accomplished by moving the adjusting rod 51 relative to the end cap 12 along the lengthwise direction X to a predetermined position and tightening the lock nuts 52. Therefore, the operation is simple and adjustment is easy.

In some optional embodiments, in the damping integrated device 100 provided in the above embodiments, a buffer pad 60 capable of being deformed by force in the lengthwise direction X, is provided on a surface of the connecting member 22 away from the elastic member 21. The buffer pad 60 is disposed facing the non-return limiting component 50. With the above configuration, when the connecting member 22 comes into contact with the non-return limiting component 50, a flexible contact is generated, so the non-return force is not too large, and the use safety of the damper 1 to which the damping integrated device 100 is applied can be further ensured. Optionally, the buffer pad 60 may be a buffer structure such as a rubber pad, a sponge pad, and the like which can be deformed in the lengthwise direction X when subjected to force.

Alternatively, in some examples, the adjusting rod 51 may also be an elastic rod. Optionally, the adjusting rod 51 is capable of being deformed by force in the lengthwise direction X. Likewise, the non-return force is not too large, and the use safety of the damper 1 to which the damping integrated device 100 is applied can be further ensured Please continue to refer to FIG. 2 to FIG. 8. As an optional implementation, in the damping integrated device 100 provided in the above embodiments, the first connector 30 may be a rod component. Since the first connector 30 adopts the above-mentioned form, it has a simple structure and is easily connected with the damping body portion 200 and other devices, thereby the overall cost of the damping integrated device 100 can be reduced. In some optional embodiments, the first connector 30 may be hinged with the damping body portion 200 by in particular a ball hinge or a Hooke hinge.

Optionally, a through hole 10b is provided on the base body 10 at the position where the first connector 30 is connected with the base body 10, a second roller 70 is provided on a side wall enclosing the through hole 10b, and the base body 10 is in rolling fit with the first connector 30 via the second roller 70. With the above configuration, a rolling friction is generated at the connection between the first connector 30 and the base body 10, thereby smooth movement of the first connector 30 in the lengthwise direction X can be further ensured and the vibration reduction effect can be optimized.

Optionally, the first connector 30 is disposed coaxially with the cylinder 11 of the base body 10, so the first connector 30 can transmit the force to the frequency adjustment component 20 and the damping component 40 uniformly when subjected to the action from the first mass block 200b of the damping body portion 200, thereby further satisfying the requirements for frequency adjustment and vibration reduction of the damper 1 to which the damping integrated device 100 is applied.

In some optional examples, the above-mentioned through hole 10b may be provided on the end cap 12 where the base body 10 and the first connector 30 are connected with each other, so as to ensure the connection requirements between the first connector 30 and the damping body portion 200 and between the frequency adjustment component 20 and the damping component 40.

In some optional embodiments, the damping integrated device 100 provided in the above embodiments further includes a second connector 80. The second connector 80 is disposed opposite to the first connector 30 in the lengthwise direction X, and the second connector 80 is connected to an end of the base body 10 away from the first connector 30. By providing the second connector 80, the connection requirements between the damping integrated device 100 and the component to be damped (e.g., the tower 2) or other components of the damper 1 can be facilitated, and thereby the damping requirement of the damper 1 to which the damping integrated device 100 is applied can be satisfied. Optionally, the second connector 80 may be rotatably connected with the component to be damped (e.g., the tower 2) or other components of the damper 1 by optionally a ball hinge or a Hooke hinge.

In some optional embodiments, the second connector 80 may also be a rod component. Optionally, the second connector 80 may be coaxially disposed with the first connector 30, to optimize the performance of the damping integrated device 100. Optionally, the second connector 80 may be fixedly connected to the end cap 12 of the base body 10 away from the first connector 30.

When the damping integrated device 100 provided in the embodiment of the present disclosure is assembled, the magnet 43 may be connected to the mounting member 41, and the supporting member 42 may be then mounted onto the mounting member 41, thereafter, the formed module may be connected with the connecting member 22. When the buffer pad 60 is included, the buffer pad 60 may be connected on the surface of the connecting member 22 away from the mounting member 41 to form a module to be installed, and the module to be installed may be installed into the inner cavity 10a of the base body 10, and then, the first connector 30 and the elastic member 21 may be connected, and the corresponding end cap 12 may be provided. When the second roller 70 is included, the second roller 70 may be installed between the end cap 12 and the first connector 30, and the end cap 12 with the second roller 70 may be then connected to the cylinder 11 of the base body 10, and the assembling of the device is finished. During use, the first connector 30 of the damping integrated device 100 may be connected to the damping body 200 of the damper 1, and an end of the base body 10 away from the first connector 30 may be connected to a fixed end (e.g., the inner wall of the tower 2) of the wind turbine. During use, when the first opening 111 is included, the frequency adjustment and routine maintenance of the spring 211 can be performed through the first opening 111 on a side end face of the main structure.

Figure 9:
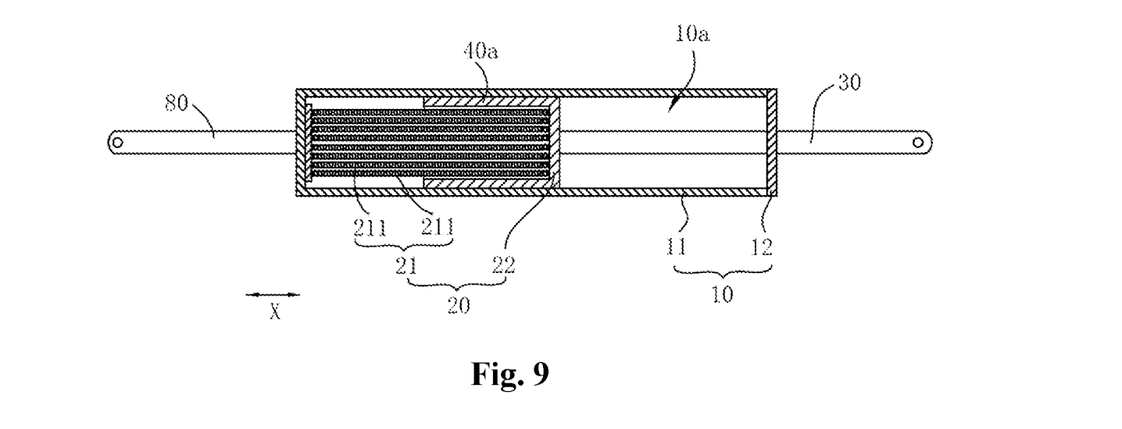
FIG. 9 is a schematic cross-sectional structural diagram of a damping integrated device according to another embodiment of the present disclosure.

Please refer to FIG. 9 together. It can be appreciated that the above-mentioned embodiments of the present disclosure are all illustrated as examples in which the damping component 40 includes the mounting member 41, the supporting member 42 and the magnet 43, and the above manner is an optional implementation but is not limited. In some other examples, the damping component 40 may also include a friction body 40a connected to the connecting member 22. The friction body 40a abuts against the cylinder 11, and the first connector 30 is capable of driving the friction body 40a to move relative to the cylinder 11 by the connecting member 22, so that the friction body 40a is in friction fit with the cylinder 11. With the above configuration, the first connector 30 can be moved along the lengthwise direction X under the action of the damping body portion 200, the friction body 40a can be then driven to move relative to the cylinder 11 under the action of the connecting member 22 to generate the frictional heat between the friction body 40a and the cylinder 11, so the kinetic energy of the first connector 30 can be continuously absorbed and converted into the thermal energy of the cylinder 11, thereby the vibration reduction requirement can be also satisfied.

Optionally, the friction body 40a may have a cylindrical structure and be disposed coaxially with the cylinder 11. With the above configuration, the frictional contact area between the friction body 40a and the cylinder 11 can be increased, thereby the kinetic energy of the first connector 30 can be better absorbed, and the vibration reduction effect may be optimized.

In some optional embodiments, the friction body 40a may be integrally formed with the connecting member 22, so the connection strength is high, and the assembling of the damping integrated device 100 is easy. When the damping component 40 adopts the above structure, a third opening (not shown) opposite to the first opening 111 of the cylinder 11 may be provided on the friction body 40a as required, so as to better ensure the heat dissipation requirements of the damping integrated device 100.

Figure 10:
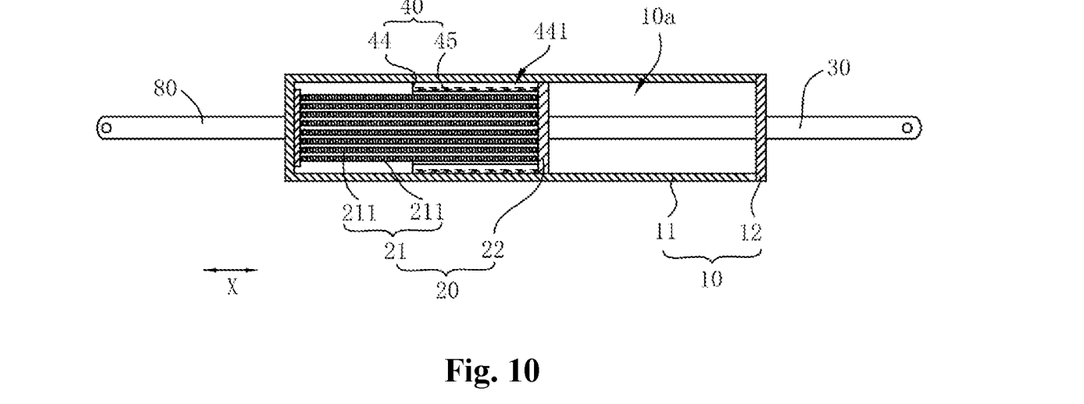
FIG. 10 is a schematic cross-sectional structural diagram of a damping integrated device according to still another embodiment of the present disclosure.

Please refer to FIG. 10 together. Optionally, in some examples, the damping component 40 may also include a bearing body 44 having a closed cavity 441 and a damping liquid 45 disposed in the closed cavity 441. The bearing body 44 is in the shape of an annular cylinder and is disposed around the elastic member 21. The bearing body 44 is connected with the connecting member 22 and abuts against the cylinder 11, and the first connector 30 is capable of driving the bearing body 44 so that the damping fluid 45 reciprocates along the lengthwise direction X. With the above configuration, the first connector 30 can be moved along the lengthwise direction X under the action of the damping body portion 200, and then the bearing body 44 can be driven to move relative to the cylinder 11 under the action of the connecting member 22, so that the damping fluid 45 reciprocates along the lengthwise direction X to absorb and convert the kinetic energy of the first connector 30 into the kinetic energy of the damping fluid 45, thereby the damping effect can be also satisfied.

Figure 11:
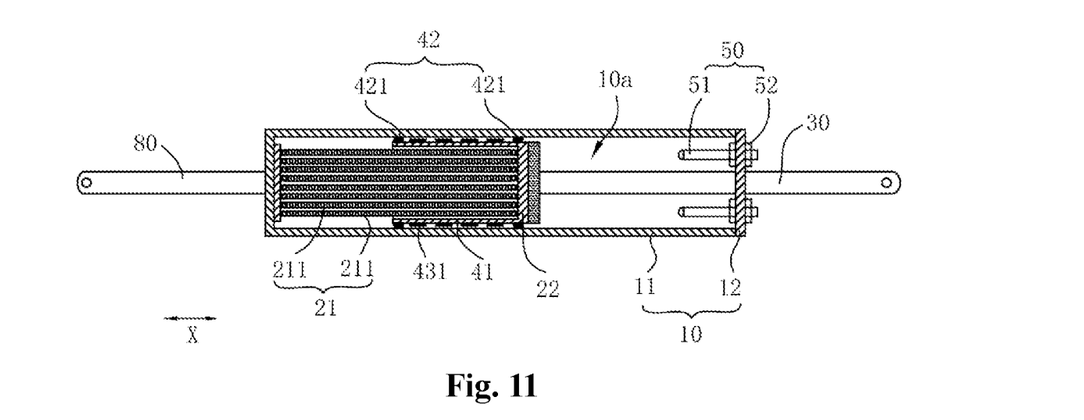
FIG. 11 is a schematic cross-sectional structural diagram of a damping integrated device according to another embodiment of the present disclosure.

Please refer to FIG. 11 together. It can be appreciated that the damping integrated devices 100 provided in the above embodiments are illustrated as examples in which the supporting member 42 includes two or more first rollers 422. In some other examples, the supporting member 42 may include two or more sliders 421, and the two or more sliders 421 are spaced apart and are fixedly connected to the mounting member 41 respectively. By providing the supporting member 42 to include the two or more sliders 421, each of which is supported between the mounting member 41 and the cylinder 11, the formation requirements of the air gap 90 can also be ensured. Meanwhile, the arrangement manner of the sliders 421 on the mounting member 41 may be the same as the arrangement manner of the first rollers 422 on the mounting member 41, and details are not repeated here.

Figure 12:
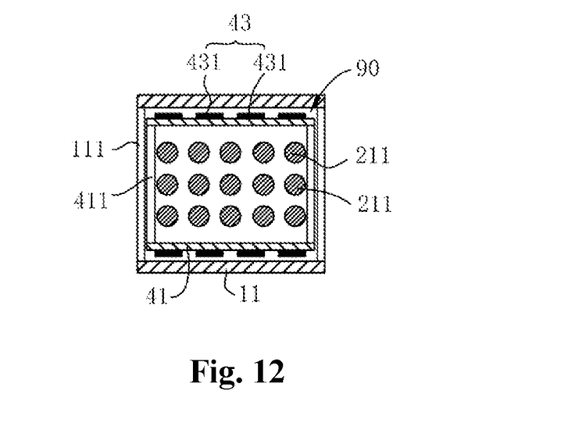
FIG. 12 is a cross-sectional view of the damping integrated device taken along the lengthwise direction according to still another embodiment of the present disclosure.

Please refer to FIG. 12 together. The above-mentioned embodiments are illustrated as examples in which the cross-sectional of the cylinder 11 in the lengthwise direction X is an annular. It can be appreciated that the above-mentioned manner is an optional implementation but is not limited thereto. In some other examples, the cross-section of the cylinder 11 in the lengthwise direction X may also be a polygon, optionally a regular polygon. Meanwhile, the mounting member 41 inside may also be shaped to match the cylinder 11. In addition, when the first opening 111 is provided on the cylinder 11, the first opening 111 may penetrate the side wall of the cylinder 11 in the direction intersecting the lengthwise direction X. When the number of the first openings 111 is two or more, the two or more first openings 111 may also be spaced apart in the circumferential direction of the cylinder 11, for example, may be provided on different sidewall surfaces of the cylinder 11. All of the above configurations can satisfy the performance requirements of the damping integrated device 100.

Figure 13:
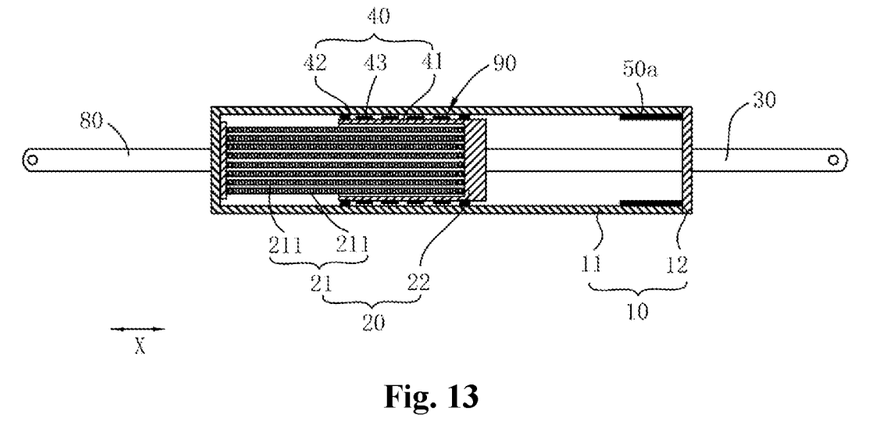
FIG. 13 is a schematic cross-sectional structural diagram of a damping integrated device according to still another embodiment of the present disclosure.

Please refer to FIG. 13, as an optional implementation, the damping integrated devices 100 provided in the above-mentioned embodiments are all illustrated as examples in which the non-return limiting component 50 includes the adjusting rod 51 extending along the lengthwise direction X and connected to the base body 10, and this is an optional implementation. In some other examples, the non-return limiting component 50 may include a friction plate 50a. The friction plate 50a is located in the inner cavity 10a and connected to a side of the base body 10 away from the elastic member 21 in the lengthwise direction X, and the friction plate 50a may rub against the connecting member 22 to stop the movement of connecting member 22. Likewise, the non-return limiting requirements of the damping integrated device 100 can also be satisfied.

Optionally, the friction plate 50a may be an annular plate that is shaped to match the shape of the inner wall of the cylinder 11, and may be located inside the cylinder 11 and engage with the cylinder 11. Therefore, the friction plate 50a can be easily installed, and the non-return limiting requirements can also be satisfied.

In some optional embodiments, the friction plate 50a may be detachably connected with the cylinder 11, so the friction plate 50a with different friction coefficients may be replaced to satisfy the different non-return limiting requirement of the damper 1 to which the damping integrated device 100 is applied.

Therefore, the damping integrated devices provided in the embodiments of the present disclosure include the base body 10, the frequency adjustment component 20, the first connector 30 and the damping component 40. The frequency adjustment component 20 includes the elastic member 21 and the connecting member 22 disposed in the inner cavity 10a of the base body 10. The elastic element 21 is connected with the base body 10 and the connecting member 22, respectively, and the connecting member 22 is connected with the first connector 30. The damping component 40 is also located in the inner cavity 10a of the base body 10, and is connected to the connecting member 22 and abuts against the inner wall of the base body 10. When the damping integrated device 100 is in use, the main body portion of the damper 1 may be connected with the component to be damped (e.g., the tower 2) via the first connector 30 and the end of the base body 10 away from the first connector 30, respectively. Since both the elastic member 21 and the damping component 40 are connected to the first connector 30 via the connecting member 22 and are connected to or press against the base body 10, respectively, the damping integrated device 100 can have both frequency adjustment and damping characteristics. Since the frequency adjustment component 20 and the damping component 40 are integrated into the inner cavity 10a of the base body 10, the damping integrated device 100 has a compact overall structure, is easy to maintain, and has few interfaces and strong versatility, while satisfying the requirements for frequency adjustment and damping.

Since the damper 1 provided in the embodiments of the present disclosure includes the damping integrated device 100 provided in the above-mentioned embodiments, the requirements for frequency adjustment and damping can be satisfied. Further, when the damping integrated device 100 includes the non-return limiting component 50, the corresponding damper 1 integrates the non-return limiting component 50 into the base body 10, and thus few interfaces and easy maintenance can be achieved while the vibration reduction requirement are satisfied.

Figure 14:
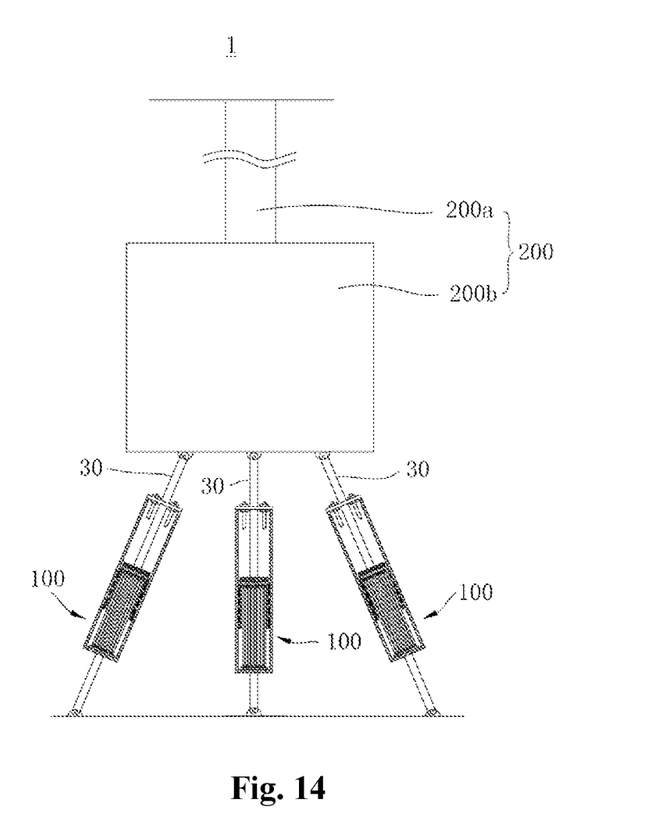
FIG. 14 is a schematic structural diagram of a damper according to another embodiment of the present disclosure.

Please refer to FIG. 14 together, it can be appreciated that the damper 1 provided in the above-mentioned embodiments of the present disclosure may be a swing damper, and the damping integrated device 100 included therein may be one in number, alternatively, may also be plural in number. When the number is plural, the plural damping integrated devices 100 may be connected to different surfaces of the first mass block 200b. Alternatively, in some examples, as shown in FIG. 14, the plural damping integrated devices 100 may also be connected to the same surface of the first mass block 200b, as long as the performance requirements of the damper 1 can be satisfied, and the specific limitations will not be described here.

Figure 15:
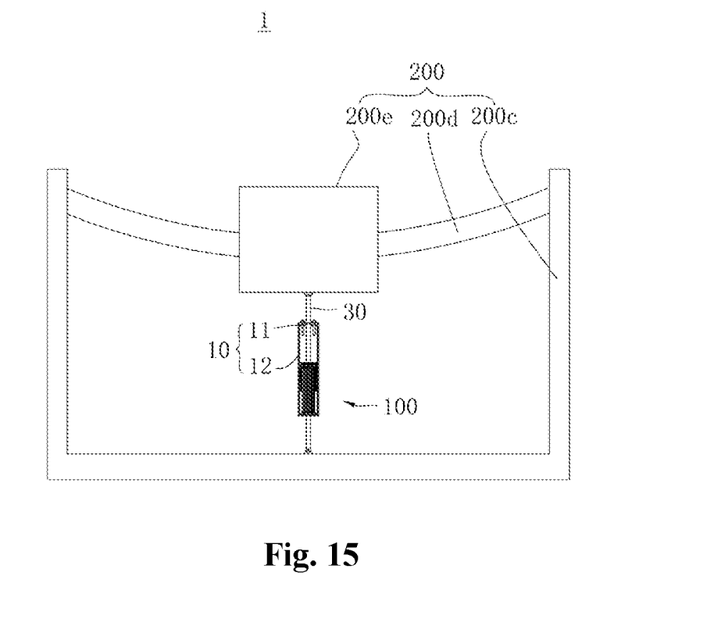
FIG. 15 is a schematic structural diagram of a damper according to still another embodiment of the present disclosure.

Please also refer to FIG. 15, the dampers 1 provided in the above-mentioned embodiments of the present disclosure are all illustrated as examples in which the damping body 200 includes the swing arm 200a, the first mass block 200b connected to the swing arm 200a and the portion of the first connector 30 protruding out of the base body 10 is hinged with the first mass block 200b. This manner is an optional implementation but is not limited hereto. In some examples, the damping body portion 200 includes a base 200c, an arc-shaped slide rail 200d supported onto the base 200c, and a second mass block 200e disposed on the arc-shaped slide rail 200d and slidably connected to the arc-shaped slide rail 200d. The portion of the first connector 30 protruding out of the base body 10 is hinged with the second mass block 200e, and the end of the base body 10 away from the first connector 30 is hinged with the base 200c. With the above configuration, the damping limiting requirement of the damper 1 can also be satisfied. Moreover, when the damping body 200 adopts the above structure, the damper 1 may be placed onto the component to be damped (e.g., the tower 2) and connected to the component to be damped via the base 200c, and thereby the vibration damping requirements can also be satisfied.

Optionally, the base 200c may have a frame structure with a recess, the arc-shaped slide rail 200d is located in the recess of the base 200c and is connected to a side wall of the base 200c, and the arc-shaped slide rail 200d protrudes toward an inner side of the recess. The second mass block 200e can slide along the arc-shaped trajectory of the arc-shaped slide rail 200d to absorb the kinetic energy of the component to be damped. When the second mass block 200e moves relative to the arc-shaped slide rail 200d, since the first connector 30 is connected with the second mass block 200e, the first connector 30 can move relative to the base body 10 along the lengthwise direction of the damping integrated device 100, in turn to drive the frequency adjustment component 20 and the damping component 40 to realize the frequency adjustment and damping functions, thus the correspondingly provided non-return limiting component 50 can limit the length of the first connector 30 protruding out of the base body 10, thereby limiting the maximum stroke of the second mass block 200e on the arc-shaped slide rail 200d, and ensuring the safety of the damping.

It can be appreciated that the wind turbines provided in the above embodiments of the present disclosure are all illustrated as examples in which the damper 1 is placed onto the tower 2, and this manner is an optional implementation. In some other examples, the damper 1 may also be placed inside the nacelle 3 or in other components that need to be damped.

Since the wind turbines provided in the embodiments of the present disclosure includes the damper 1 provided in the above-mentioned embodiments, it has better vibration damping effect, high safety performance and easy maintenance.

While the present disclosure has been described with reference to the preferred embodiments, various modifications may be made and equivalents may be substituted for components thereof without departing from the scope of the present disclosure. In particular, as long as there is no structural conflict, each technical feature mentioned in various embodiment can be combined in any manner. The present disclosure is not limited to the specific embodiments disclosed herein, but includes all technical solutions falling within the scope of the claims.

The invention claimed is:

1. A damping integrated device, comprising:
   a base body, which has a predetermined length and includes an inner cavity extending along a lengthwise direction thereof;
   a frequency adjustment component disposed in the inner cavity WO, the frequency adjustment component comprising an elastic member and an connecting member, with one end of the elastic member in the lengthwise direction being connected to the base body, and the other end thereof being connected to the connecting member;
   a first connector extending into the inner cavity and at least partially protruding out of the base body in the lengthwise direction, the first connector being connected to the connecting member and capable of moving relative to the base body, so as to make the elastic member stretch or shrink in the lengthwise direction; and
   a damping component disposed in the inner cavity, the damping component being connected to the connecting member and at least partially abutting against an inner wall of the base body, and the damping component being configured to absorb kinetic energy of the first connector.

2. The damping integrated device according to claim 1, wherein the elastic member comprises two or more springs, which are spaced apart and extend respectively along the lengthwise direction, one end of each of the two or more springs is connected to the base body and the other end thereof is connected to the connecting member, and at least one of the two or more springs is detachably connected to the base body and the connecting member, respectively.

3. The damping integrated device according to claim 1, wherein the base body comprises a cylinder extending along the lengthwise direction and end caps respectively disposed at both ends of the cylinder in the lengthwise direction, the end caps and the cylinder are enclosed together to form the inner cavity, and in a direction intersecting the lengthwise direction, a spacer cavity is formed between the cylinder and the frequency adjustment component, and the damping component is located in the spacer cavity.

4. The damping integrated device according to claim 3, wherein the damping component comprises a mounting member, a supporting member and a magnet, one end of the mounting member in the lengthwise direction is connected to the connecting member, the magnet is disposed facing the cylinder and is connected to the mounting member, the supporting member is supported between the mounting member and the cylinder, such that an air gap is formed between the magnet and the cylinder; and
   the first connector is capable of driving the magnet to move relative to the base body via the connecting member and generating an induced eddy current in the base body.

5. The damping integrated device according to claim 4, wherein the mounting member has a cylindrical structure and is disposed around the elastic member, the connecting member is shaped to match the mounting piece and is connected to and closes one end of the mounting piece in the lengthwise direction, and the magnet includes a plurality of magnet blocks; and
   at least part of the plurality of magnet blocks are spaced apart in the lengthwise direction, and/or, at least part of the plurality of magnet blocks are spaced apart along an outer annular surface of the mounting member.

6. The damping integrated device according to claim 4, wherein the supporting member comprises two or more sliding blocks, which are spaced apart and are fixedly connected to the mount, respectively.

7. The damping integrated device according to claim 4, wherein the supporting member comprises two or more first rollers, which are spaced apart and are rotatably connected to the mounting piece respectively.

8. The damping integrated device according to claim 4, wherein the cylinder is provided with a first opening which is in communication with the inner cavity, and the mounting member is provided with a second opening which is disposed opposite to the first opening.

9. The damping integrated device according to claim 3, wherein the damping component comprises a friction body connected to the connecting member, the friction body abuts against the cylinder, and the first connector is capable of driving the friction body to move relative to the cylinder through the connecting member, such that the friction body is in friction fit with the cylinder.

10. The damping integrated device according to claim 3, wherein the damping component comprises a bearing body having a closed cavity and a damping liquid disposed within the closed cavity, the bearing body is in a shape of an annular cylinder and is disposed around the elastic member, the bearing body is connected with the connecting member and abuts against the cylinder, and the first connector is capable of driving the bearing body to move relative to the base body through the connecting member, such that the damping liquid reciprocates along the lengthwise direction.

11. The damping integrated device according to claim 1, wherein the damping integrated device further comprises a non-return limiting component, which is connected to one end of the base body in the lengthwise direction, the non-return limiting component is configured to restrict a maximum dimension of the first connector protruding out of the base body in the lengthwise direction.

12. The damping integrated device according to claim 11, wherein the non-return limiting component comprises an adjusting rod extending along the lengthwise direction and connected to the base body, the adjusting rod at least partially extends into the inner cavity, a size of the adjusting rod extending into the inner cavity is adjustable, and the adjusting rod abuts against a surface of the connecting member away from the elastic member to limit a displacement amount of the connecting member along the lengthwise direction in the base body.

13. The damping integrated device according to claim 11, wherein the non-return limiting component comprises a friction plate, which is located in the inner cavity and connected on a side of the base body away from the elastic member in the lengthwise direction, and the friction plate is in friction fit with the connecting member to stop the connecting member.

14. The damping integrated device according to claim 11, wherein a buffer pad capable of being deformed by force in the lengthwise direction, is provided on a surface of the connecting member away from the elastic member, and the buffer pad is disposed facing the non-return limiting component.

15. The damping integrated device according to claim 1, wherein the first connector is a rod component, the base body is provided with a through hole at a position where the base body is connected to the first connector, a second roller is provided on a side wall enclosing the through hole, and the base body is in rolling fit with the first connector through the second roller.

16. The damping integrated device according to claim 1, wherein the damping integrated device further comprising a second connector, which is disposed opposite to the first connector in the lengthwise direction, and the second connector is connected to an end of the base body away from the first connector.

17. A damper, comprising:
a damping body portion; and
the damping integrated device according to claim 1, wherein a portion of the first connector of the damping integrated device protruding out of the base body is rotatably connected to the damping body portion.

18. The damper according to claim 17, wherein the damping body portion comprises a swing arm and a first mass block connected to the swing arm, and the portion of the first connector protruding out of the base body is hinged with the first mass block.

19. The damper according to claim 17, wherein the damping body portion comprises a base an arc-shaped slide rail supported onto the base and a second mass block disposed on the arc-shaped slide rail and slidably connected to the arc-shaped slide rail the portion of the first connector protruding out of the base body is hinged with the second mass block, and an end of the base body away from the first connector is hinged with the base.

20. A wind turbine, comprising the damper according to claim 1.

* * * * *